United States Patent Office 3,707,533
Patented Dec. 26, 1972

3,707,533
PHENYL-AZO-PHENYL DISPERSE DYES
Raymond Joseph Pohl, Wilmington, Del., assignor to E. I. du Pont de Nemours and Company, Wilmington, Del.
No Drawing. Filed Jan. 31, 1967, Ser. No. 612,791
Int. Cl. C07c 107/06; C09b 29/08
U.S. Cl. 260—207
10 Claims

ABSTRACT OF THE DISCLOSURE

This invention is directed to monoazo disperse dyes, process and polyester fibers dyed therewith, as hereinafter described, which dyes exhibit significantly desirable light fastness, bloom, temperature sensitivity, scourability, crock-, wash-, ozone-, and gas-fume fastness. Further, the dyes of this invention achieve superior sublimation and superior perspiration fastness when applied to polyester-cellulosic blend fabrics which fabrics are subjected to durable press treatment.

BACKGROUND OF THE INVENTION

Field of the invention

The present invention relates to novel disperse dyes, principally in the yellow region of the spectrum, and their application to polyester fibers and cellulosic blends thereof. These dyes have significant utility before and after an optional durable press treatment.

DESCRIPTION OF THE PRIOR ART

U.S. 2,782,187 describes dyes of the structure:

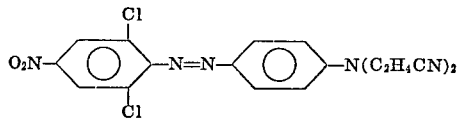

Netherlands publication 66, 00581 discloses intermediates of the type:

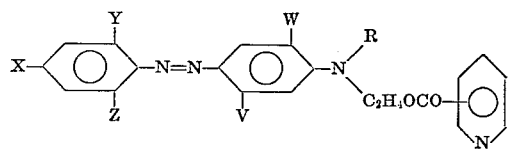

which are converted to cationic dyes;
Where
X=H, CN, halogen, carbalkoxy, alkylsulfonyl, phenylazo or $NO_2$;
Y=H, CN, $NO_2$, halogen, alkyl, alkoxy, $CF_3$ or carbalkoxy;
Z=H or halogen;
at least one of X and Y is $NO_2$, CN, alkylsulfonyl, carbalkoxy or phenylazo group;
V=H, halogen, alkyl, alkoxy, or acylamino;
W=H, alkyl or alkoxy;
R=alkyl, cyanoalkyl, alkoxyalkyl or acyloxyalkyl.

British Pat. 813,906 describes azo dyes useful in dyeing textiles, especially cellulose acetate textiles and textiles made from synthetic polyamides, polyesters, and acrylonitrile copolymers. The dyes have the general formula

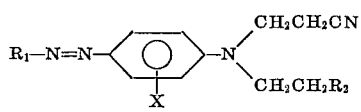

in which $R_1$=residue of an aromatic amine excluding an aromatic amine having an $SO_2F$ group in the 2-position, $R_2$=acyl residue of an *aliphatic* carboxylic acid in which the O atom is attached to the beta C atom of the N ethyl substituent and X is H or a non-reactive substituent on the benzene nucleus which does not interfere with the initial formation of the dye. The dyes are reported to have good affinity for cellulose acetate textiles and most of the synthetics, and they have good fastness properties. Further, when the diazo component contains a nitro group, the dyes possess unusually good gas and lightfastness properties.

British Pats. 852,396; 852,493; and 872,204 all relate to water-insoluble monoazo dyestuffs obtained from a coupler

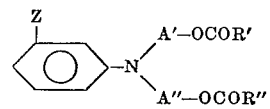

where Z may be H, A' and A" represent alkylene radicals and may be same or different, R' and R" may be substituted or unsubstituted hydrocarbon radicals such as phenyl and substituted aryl as anisyl. The dyes are reported to have excellent affinity for polyester fibers which they color in orange to scarlet shades possessing excellent fastness to washing, to dry heat treatments, and to light.

Netherlands 66, 00528 discloses dyestuffs, used to dye cellulose acetate, polyamide and polyester textiles, as follows:

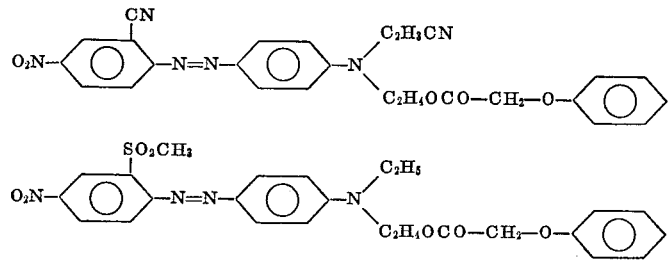

SUMMARY OF THE INVENTION

This invention, more specifically, is directed to monoazo dyes of the generic structure:

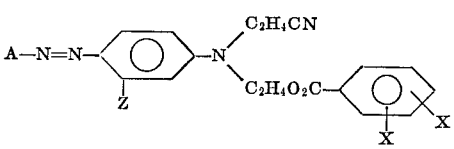

wherein:
A=a substituted phenyl group bearing up to 3 substituents selected from the group —$NO_2$, halogen, —CN, $C_{1-4}$ alkyl, $C_{1-4}$ alkoxy, trifluoromethyl, $C_{1-4}$ alkylsulfonyl, phenylsulfonyl, $C_{1-4}$ N-alkylsulfamyl, $C_{1-4}$ N-alkylcarboxamido, $C_{1-4}$ carbalkoxy, benzoyl and N-phenylsulfamyl;
X and Y=the same or different substituents selected from the group H, halogen, $C_{1-4}$ alkyl, nitro, $C_{1-4}$ alkanoyloxy and $C_{1-4}$ alkoxy;
Z=$C_{1-4}$ alkyl, $C_{1-4}$ alkoxy, halogen, or hydrogen.

The present invention also relates to the process for preparing the heretofore defined monoazo dyes, said process consisting of diazotizing a compound A—NH$_2$ wherein A contains the substituents defined above, followed by coupling to a compound of the formula:

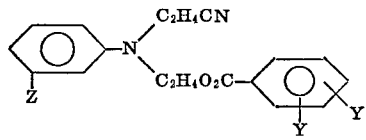

wherein X, Y and Z are as specified above.

The novel dyes of this invention include those having the structure:

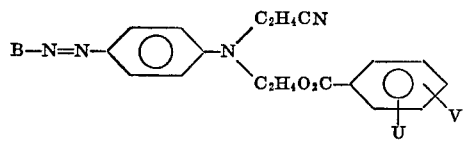

wherein B=a substituted phenyl group bearing up to three substituents selected from the group —CN, halogen, —NO$_2$, —CF$_3$, benzoyl, phenylsulfonyl, C$_{1-4}$ alkyl, C$_{1-4}$ carbalkoxyl, C$_{1-4}$ N-alkylsulfamyl, and N-phenylsulfamyl; U and V=the same or different substitutents selected from the group H and acetoxy.

This invention also encompasses the process of preparing monoazo dyes as heretofore described which consists of diazotizing a compound B—NH$_2$, wherein B contains the substituents defined heretofore, and coupling to a compound of the formula

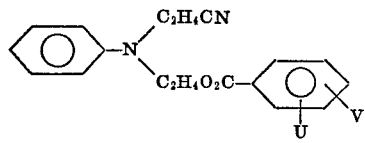

wherein U and V are as heretofore defined.

As indicated, this invention is also directed to the process of dyeing polyester fibers with the invention dyes, preferably, by padding polyester fibers, either singly or in cellulosic blends, with an aqueous dispersion of the dyestuffs of said dyes followed by dry heat (e.g., Thermosol) fixation. Also included is that process of dyeing and printing polyester fibers and their cellulosic blends, with the invention dyes, preferably on a fabric which is subsequently to receive a durable press treatment.

Preferred novel dyes of this invention include the following:

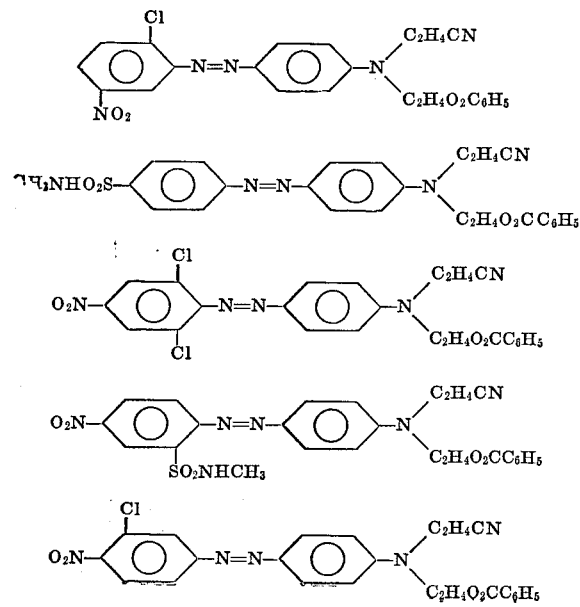

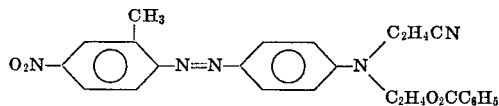
and
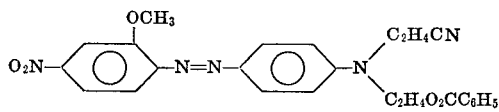

As stated heretofore, the present invention also encompasses polyester fibers and blends of polyester fibers dyed or printed with an invention dye as herein described and claimed.

The dyes of this invention are prepared by coupling the diazo derived from a substituted aniline A—NH$_2$ as previously defined, to the coupling component

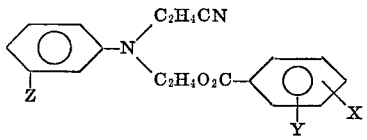

as previously defined. Useful examples of the substituted anilines, A—NH$_2$, include the following compounds in Tables I and II.

TABLE I

Substituted anilines useful in the practice of this invention

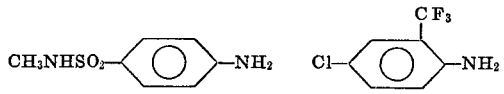
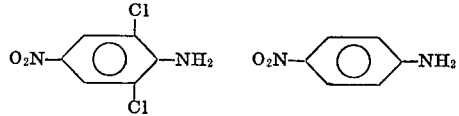
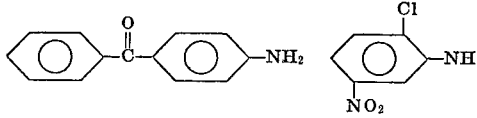
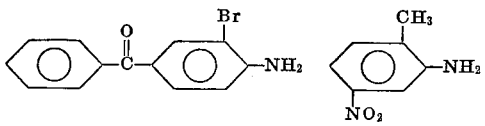
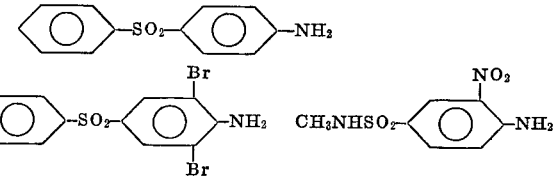
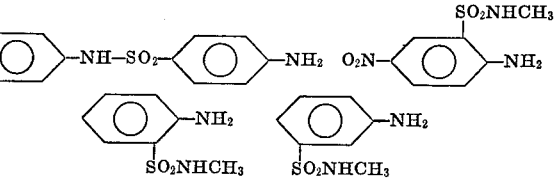
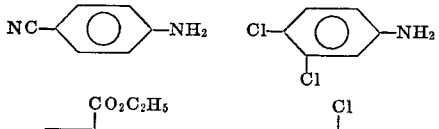
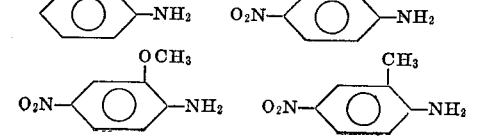

TABLE II

Additional substituted anilines useful in the practice of this invention 4-nitro-2-cyanoaniline
2,4-dicyanoaniline
3-chloro-4-cyanoaniline
2-cyano-5-chloroaniline
3,4-dicyanoaniline
2,5-dicyanoaniline
2-chloro-4-cyanoaniline
2-chloro-5-cyanoaniline
4-aminophenyl-methylsulphone
4-amino-acetophenone
2-amino-5-nitrotoluene
2-amino-5-nitroanisole
3-nitro-4-aminotoluene
2,4-dichloroaniline
2-cyano-4,5,6-trichloroaniline
2,4-dinitro-6-bromoaniline
2-cyano-4,6-dinitroaniline
2-cyano-6-bromo-4-nitroaniline
2,5-dichloro-4-nitroaniline
3-chloro-4-amino-1-trifluoromethyl-benzene
2-cyano-5-chloro-4-nitroaniline
2-amino-5-nitro-benzoic-acid methyl ester
3-nitro-4-aminobenzoic acid butyl ester
4-aminobenzoic acid methyl ester
4-aminobenzoic acid alkyl amides, as -methyl or -dimethyl amide.

Useful examples of the coupler,

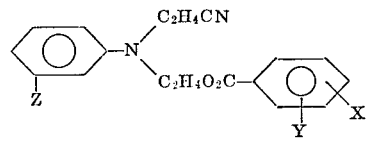

include the compounds as follows in Table III:

TABLE III
Useful couplers for the present invention $$R_1-N\overset{R_2}{\underset{}{-}}CH_2CH_2O\underset{\underset{O}{\|}}{C}-R_3$$

| | $R_1$ | $R_2$ | $R_3$ |
|---|---|---|---|
| 1 | —$C_6H_5$ | —$C_2H_4CN$ | —$C_6H_5$ |
| 2 | —$C_6H_5$ | —$C_2H_4CN$ | |
| 3 | —$C_6H_5$ | —$C_2H_4CN$ | |
| 4 | —$C_6H_5$ | —$C_2H_4CN$ | p-Tolyl- |
| 5 | —$C_6H_5$ | —$C_2H_4CN$ | o-Tolyl- |
| 6 | —$C_6H_5$ | —$C_2H_4CN$ | — |
| 7 | —$C_6H_5$ | —$C_2H_4CN$ | m-Chlorophenyl- |
| 8 | —$C_6H_5$ | —$C_2H_4CN$ | p-Chlorophenyl- |
| 9 | —$C_6H_5$ | —$C_2H_4CN$ | o-Nitrophenyl- |
| 10 | —$C_6H_5$ | —$C_2H_4CN$ | m-Nitrophenyl- |
| 11 | —$C_6H_4$-m-$CH_3$ | —$C_2H_4CN$ | p-Nitrophenyl- |
| 12 | —$C_6H_4$-m-$OCH_3$ | —$C_2H_4CN$ | 2,4-dinitrophenyl- |
| 13 | —$C_6H_4$-m-Cl | —$C_2H_4CN$ | 3,5-dinitrophenyl- |
| 14 | —$C_6H_4$-m-Br | —$C_2H_4CN$ | 2,4-dichlorophenyl |
| 15 | —$C_6H_5$ | —$C_2H_4CN$ | 2,5-dichlorophenyl |
| 16 | —$C_6H_5$ | —$C_2H_4CN$ | p-t-Butylphenyl- |
| 17 | —$C_6H_5$ | —$C_2H_4CN$ | 2-chloro-5-nitrophenyl |

The preferred dyes of this invention are prepared by diazotizing substituted anilines B—$NH_2$ and coupling to

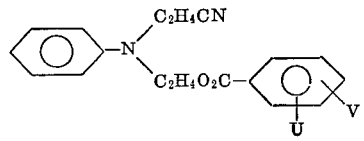

Useful examples of B—$NH_2$ are included in Table I; useful examples of the coupler are entries 1–3 of Table III. When 4-nitro-2-cyanoaniline (Table II, entry 1) is coupled to N-2-cyanoethyl-N-2-benzoyloxyethylaniline (Table III, entry 1)

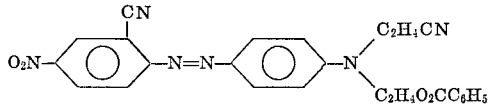

is produced.

The coupler is prepared by dissolving N-2-cyanoethyl-N-2-hydroxyethylaniline in toluene in an approximate weight ratio of 1 to 1.1 and then adding a molar equivalent of the appropriate benzoyl chloride to the solution at room temperature. A molar ratio of an acid acceptor, e.g., pyridine, is then added; pyridine hydrochloride precipitates as the reaction proceeds, thus yielding a slurry. Water is then added to the slurry to dissolve the pyridine hydrochloride, the two phases are allowed to separate, and the aqueous phase removed. The toluene phase, containing the product, is slurried with water and enough sodium bicarbonate to yield a mixture with a pH of 6.5 to 7.5. The toluene and any residual pyridine are then removed by steam distillation. After complete removal of the toluene, the resulting N-2-cyanoethyl-N-2-benzoyloxyethylaniline separates as an oil in the aqueous system. This oil is removed from the hot aqueous layer and solidifies on cooling.

As evident from the above process, this esterification could be optionally effected with aroyl chlorides $R_3COCl$ where $R_3$ is as shown in Table III, and certain meta substituted N-2-cyanoethyl-N-2-hydroxyethylanilines could be used.

Diazotization of the starting substituted anilines may be accomplished either in aqueous mineral acid, or in nitrosyl sulfuric acid. General descriptions of these two diazotization processes and the subsequent coupling to yield the monoazo dyes of this invention are as follows:

The preparation of the azo dye from 2,6-dichloro-4-nitro-aniline and N - 2 - cyanoethyl - N - 2 - benzoyloxyethylaniline begins with a nitrosyl sulfuric acid diazotization. Thus, sodium nitrite is added with agitation to an excess of 98±2% sulfuric acid over two to three hours, holding the temperature in the range 20–35° C. Upon completing the sodium nitrite addition, the mixture is heated to 55±5° C. over one to three hours and agitated to effect solution. If undissolved sodium nitrite is still present, the mixture may be heated over one to two hours to 80±5° C. and held at that temperature until complete solution is achieved. Then, with external cooling, the solution is cooled to 20–30° C., and 2,6-dichloro-4-nitroaniline is added over about two hours, maintaining the temperature at 20–30° C. Following addition of 2,6-dichloro-4-nitroaniline to the nitrosyl sulfuric acid, the mixture is stirred at 25–30° C. for one hour to complete the diazotization. The diazo solution is then poured into a cold, agitated acetic acid-ice mixture (in a ratio of about 44:56 parts by weight) at such a rate that the temperature does not exceed 5° C. An endothermic reaction occurs so that the temperature may fall as low as —10° C. This is perfectly satisfactory; the critical point is to not allow the temperature to exceed 10° C. When all the sulfuric acid solution has been added, a small quantity of urea is added and the solution stirred for about 15 minutes. If the diazo is to be held pending preparation of the coupler solution, its temperature must remain below 5° C.

In the preparation of the coupler solution, it is important that dry equipment, free from mineral acid, be used. Undesired water can cause premature precipitation of the coupler during coupling. Mineral acid can cause hydrolysis of the coupler with a resulting failure in the dye synthesis and the formation of intractable tars. Thus, molten N-2-cyanoethyl-N-2-benzoyloxyethylaniline is added to excess acetic acid and the mixture is stirred for about ½ hour at 20–30° C. to effect complete solution. This coupler solution is then added to the cold diazo solution within about 20 minutes, adding ice, if necessary, to maintain the temperature below 5° C. After the coupler has been added, the mixture is stirred at 5±2° C. until a negative diazo test is observed (about 20 minutes). Stirring is continued, if necessary, for up to two hours to obtain a negative diazo test. However, regardless of this test, the next step is effected within two hours provided that the initially formed red slurry has changed to an orange slurry. The color change should take place within 15 minutes after the coupler is added. If it has not, additional acetic acid may be added; subsequent stirring should produce the desired physical change. Then, while maintaining stirring, water is added to dilute the strong acid and to change the product from a slightly sticky precipitate, which may tar on standing, to a granular, stable powder; the vessel contents should be in the temperature range 5–20° C. The slurry is stirred 30–45 minutes longer, at a temperature of 10–20° C., then isolated by filtration; the precipitate is washed with cold water until the washings no longer produce any color change on Congo Red paper. This wet, orange cake, containing about 35% solids, is easily milled to give a fine, aqueous dispersion.

An alternate, more economical, process variable for the preparation of the coupler solution may also be used, which indeed uses a strong mineral acid in place of acetic acid. This alternate process involves using concentrated hydrochloric acid for preparing the coupler solution. Coupler hydrolysis is prevented by keeping the temperature below 5° C., and by keeping the residence, or hold time, of the coupler in the concentrated mineral acid to two hours or less.

The substituted anilines of Tables I and II which also require nitrosyl sulfuric acid to effect diazotization include, in addition to the above, 2,4-dinitro-6-bromoaniline; 2,4-dinitro-6-chloroaniline and 2-cyano-4,6-dinitroaniline; 2-cyano-4,5,6-trichloro-aniline; 2-cyano-6-bromo-4-nitroaniline and 2,6-dibromo-diphenyl-sulfone.

The remaining substituted anilines of Tables I and II are most conveniently diazotized in aqueous mineral acid, as described below.

The diazotization of N'-methylsulfanilamide may be effected in aqueous hydrochloric acid. Thus, a slurry of N'-methylsulfanilamide was prepared in aqueous hydrochloric acid and the slurry cooled to 0–10° C. Sodium nitrite was added to the agitated slurry to effect diazotization, maintaining the temperature at 10–15° by the addition of ice, if necessary. After all the sodium nitrite had been added, the clear solution was stirred for 15 minutes at 15° C., and excess nitrite was destroyed by addition of sulfamic acid. This diazo solution was then added to the coupler, N-2-cyanoethyl-N-2-benzoyloxyethylaniline, dissolved in acetic acid and maintained at 25° C. During the addition of the diazo, the dye usually precipitates in a crystalline form; in some cases, the dye may oil out, but is then converted to its crystalline form on further agitation. After stirring for 30 minutes, sodium carbonate is added, which converts the red slurry to an orange slurry and facilitates completion of the reaction. Following an additional two-hour agitation period, the dye is isolated by filtration.

The crude, wet dye above is conveniently converted into a commercially useable form by mixing the crude dye (e.g., ten parts on a 100% basis) with about 2.5 parts of a lignin sulfonate dispersant and water in a colloid or sand mill. Milling is continued until a fine, stable, aqueous dispersion or paste is obtained with dye particle size reduced to approximately one micron.

Pastes or dispersions of the water-insoluble monoazo dyes of this invention are preferred since they are readily applicable for continuous dyeing procedures, e.g., Thermosol process. In a typical dyeing, pastes as the above, are usually diluted with water and padded onto a polyester-cellulosic fabric and dried; the fabric is then heated at 400–430° F. for 30–90 seconds to fix the dye in the polyester component. Subsequent, continuous dyeing of the cellulosic component is then effected by conventional means.

The dyes of the present invention have significant utility in the dyeing of polyester fibers and their blends with or without a subsequent optional permanent-press-finish treatment.

A representative dyeing procedure is the Thermosol method wherein:

A pad bath is prepared containing

|  | G./l. |
|---|---|
| Disperse dye | $x$ |
| A refined solution of natural gums | 20.0 |
| A sodium hydrocarbon sulfonate | 0.5 |

Pad bath is padded on "Dacron" (aromatic polyester)/cotton fabric with a pickup of 50–65% followed by drying (infrared predrying followed by hot air or hot can drying is desirable) to remove the water.

Thermosoling, in which the "Dacron" component is dyed with the disperse color, is accomplished by treating the dried pigment-padded fabric for 60–90 seconds at temperatures ranging from 204° to 222° F. Unfixed dye, whether on the "Dacron" or cotton, is removed as described below.

The fabric, after Thermosol treatment is padded with either Bath No. 1 or Bath No. 2.

BATH

No. 1

50 g./l. sodium hydroxide
40 g./l. sodium hydrosulfite
At 26.7°–37.8° C.

No. 2

60 g./l. sodium sulfide
At 82°–93.4° C.

Further processing is as follows:

BATH NO. 1

(1) Steam 30 seconds
(2) Rinse at 26.7° C.
(3) Oxidize in 2.5 g./l. sodium perborate for 10 minutes at 98.9° C.
(4) Rinse at 26.7° C.
(5) Hot scouring in 2 g./l. sodium salt of a fatty alcohol sulfate for 1 minute at 93.3° C.
(6) Rinse at 26.7° C.
(7) Extract and dry

BATH NO. 2

(1) Steam 60 seconds
(2) Hot rinse at 82.2° C.
(3) Oxidize in
 3 g./l. sodium bichromate
 3 g./l. acetic acid for 2 minutes at 60° C.
(4) Rinse cold
(5) Rinse hot, 93.3° C.
(6) Optional: hot soaping for ½ minute
(7) Hot rinse
(8) Extract and dry Cleaning has the following significance: Application of Bath No. 1, sodium hydrosulfite and sodium hydroxide, simulates application of vat dyes to the cotton component. Vat dyes would be added to the bath containing the disperse dye. Chemical padding with Bath No. 1 serves two purposes, (1) it reduced the vat dye so it can be affixed to the cellulosic fibers in the blend, (2) and removes, preferably by chemical alteration, residual disperse dye to prevent subsequent staining during washing by the ultimate consumer.

Application of Bath No. 2 simulates application of sulfur dyes to the cellulosic part of the blend; otherwise the purpose is similar.

After dyeing and cleaning, the "Dacron" component of the blend will be colored with a disperse dye and, in most cases, the cotton will be dyed either with vat dyes or sulfur dyes. (The choice of dyes on cellulosics is dictated by fastness requirements and economics.) The material may then be padded (for permanent press treatment) with a pickup of 50–65% with a bath containing:

| | G./l. |
|---|---|
| Permafresh 183 | 200.0 |
| Triton X–100 | 2.5 |
| Mykon SF | 22.5 |
| Rhoplex HA–8 | 22.5 |
| Silkand 40 | 30.0 |
| Catalyst X–4 | 36.0 |

Permafresh 183 (also called Permafresh Reactant 183) is an imidazolidone derivative which serves as the reactant for wash-wear garments by the deferred curing process.

Triton X–100 is an alkylaryl-polyether alcohol which serves as a wetting and emulsifying agent.

Rhoplex HA–8 is an acrylic dispersion of a thermoplastic resin which serves as a binder.

Catalyst X–4 (also called Sun Kem Catalyst X–4) is a curing catalyst for thermosetting resins. It contains a zinc salt complex.

Mykon SF is a nonionic paraffin-free, polyethylene emulsion which serves as a fabric softener.

Silkand 40 is a nonionic polymer emulsion which imparts luster, a silky hand, and antistatic properties to the fabric.

The resin-impregnated material is then dried to remove the water content. At this point, the resin is not cured; the goods are referred to as being "sensitized." The garment is cut from the "sensitized" goods and after assembly, by sewing, the garment is placed on suitable frames which are led into a cure chamber where curing takes place at about 163.3° C. for 15 minutes. It is very important that the disperse dyes in the garment show minimum sublimation during curing, otherwise pockets, etc., generally made of nylon, will be stained by subliming disperse dye vapor. It is also important that dyes used, particularly in this application, possess good perspiration fastness so that no objectionable staining, especially of acetate and nylon fibers occurs. The dyes of this invention satisfy these requirements, in a manner surprisingly superior to the dyes available in the prior art. Moreover, the dyes of this invention possess the other necessary properties of a commercially-suitable dye, particularly for durable press treated goods. Among these are adequate lightfastness, minimum bloom and temperature sensitivity, adequate scourability, washfastness, crockfastness, etc.

As currently practiced, the deferred cure durable press consists of the following steps:

(a) a polyester-cellulosic blend fabric is dyed;
(b) durable press finishing agents are applied;
(c) fabric is cut and made into garments;
(d) garments are pressed and finally cured.

A typical durable press finish formulation is described by V. Salvin, "The Effect of Dry Heat on Disperse Dyes," pp. 48–59, American Dyestuff Reporter, June 20, 1966.

A dyer faces many problems resulting from the deferred curing operation. To be commercially acceptable, the dyes used must exhibit a minimum degree of bloom and solvent bleed, and a maximum degree of sublimation-, wash-, ozone-, gas-fume-, and light-fastness. An objective of this invention is to provide dyes which are commercially acceptable for durable-press-finished polyester-cellulosic blends and which, therefore, possess the above described characteristics.

During the curing operation (148–177° C. for 15–18 minutes) a disperse dye may migrate from the polyester fiber into the softening and wetting agents. As a result, the disperse dye extracted from the polyester component is loosely held in the softening and wetting agents, becomes concentrated on the surface of the fiber, and thus leads to the problems encountered. Bloom is one such problem and manifests itself as a deepening of shade and often as a shade change. Moreover, the extracted dye generally exhibits poor fastness properties, especially when compared to its fastness on conventionally finished polyester fiber. Light-, ozone-, and wash-fastness are particularly deleteriously affected.

In order to minimize the migration of a dye from the polyester into the durable press finish under curing conditions, a disperse dye should have a low diffusion rate, a high solubility in polyester fibers and a low solubility in the durable press finish. It would be expected that if the diffusion rate is sufficiently low, then the dye will not be extracted by the finishing agents. A dye, however, must also possess those properties required for dyeing polyesters.

The Thermosol method of dyeing polyester-cotton blends described in U.S. 2,663,612, allows a dyer to rapidly and economically produce the huge volume of fabric now being used for durable press finished garments. The Thermosol method requires dyes with a high diffusion rate and good solubility in polyester fibers in order to fully utilize the dye, and to obtain level and reproducible dyeings. Thus, a difficult problem arises for if a dye has a high diffusion rate as required for Thermosol dyeing, then the dye may be easily extracted into the finishing agents during the durable press finish curing operation.

It is evident, then, that dyes are now required which have a moderate diffusion rate in the fiber such that they are not unduly extracted by the durable press finish, while still displaying adequate dyeing properties. Furthermore, the dye not fixed by the Thermosol dyeing method must be efficiently scoured from the surface of the fiber blend. If unfixed dye is not completely scoured, then unfixed dye may be readily extracted by the durable press finish and certainly contribute to the problems discussed above.

Perhaps it should be noted at this point that the need for scouring the unfixed dye arises particularly if the polyester is dyed by the Thermosol method; scourability is not as critical when the polyester fiber of a polyester/cellulose blend is dyed by conventional aqueous or carrier methods. Scourability can be important in aqueous dyed blends, especially with wool. In Thermosol dyeing, a fine, aqueous dye dispersion is padded onto a polyester-cotton blend. After evaporation of the water, which leaves small dye particles on the surface of the blend fabric, the dye is fixed by heating briefly (60–90 sec.) to 204–222° C. This dry heat fixation leaves residual dye mechanically adhering to the surface of the fabric. If the dye diffusion rate is slow, as required for fabrics to be finished with durable press resins, then undesirably large amounts of unfixed dye will remain adhered to the fabric surface, which must be removed by a scour. On the other hand, if the blend is dyed by an aqueous or carrier method, the dye is in equilibrium between suspended dye, dye dissolved in water, and dye dissolved (fixed) in the polyester fiber. At the end of the dyeing period, the unfixed dye remains suspended or dissolved in water, is not mechanically held appreciably on the fabric surface as with Thermosol dyeing.

Thus, for Thermosol-dyed, polyester-cotton blends, which are to be subsequently durable press finished, the dyer must select dyes which have the following three characteristics, in addition to the usual fastness requirements:

(1) A high diffusion rate in polyester fibers at the Thermosol dyeing temperature (204–222° C.);
(2) The unfixed, residual dye on the blend fabric surface must be easily scoured clean;
(3) A low diffusion rate in polyester fibers at the durable press curing temperature (148.8–176.7° C.) and high solubility in polyester fibers.

Prior to the advent of durable press technology, dyers were concerned mainly with the first requirement in order to obtain levelness, full dye utilization, shade stability, and to minimize residual dye on the fabric surface. Now that the subsequent durable press finish cure must be considered, however, it is no longer desirable to have an unduly high dye diffusion rate in polyester fibers. Furthermore, since the diffusion rate should now be somewhat lower, resulting in more unfixed dye remaining on the fabric surface, scourability becomes of prime importance. Fortunately, a dye will have a higher diffusion rate at the higher Thermosol temperature than at the lower temperature of the durable press cure. Thus, taking advantage of the diffusion rate differences at the two temperatures, dyes may be able to meet the diffusion requirements provided that the unfixed dye can be readily removed to leave a clean fiber surface.

In practice, the polyester component of a polyester-cotton blend is dyed first by the Thermosol method; the cotton component is subsequently dyed by vat or sulfur dyes. Since dyeing economics prevents any intervening steps, the vat or sulfur dyebath must simultaneously serve as the scour treatment for unfixed polyester dye. If a vat dye is used to dye the cotton, sodium hydrosulfite, which is present to reduce the vat dye to its leuco form, must be the effective scouring agent. Presumably, sodium hydrosulfite reduces the unfixed, residual disperse dye to soluble, innocuous products. If a sulfur dye is used to dye the cotton, sodium sulfide must be the effective scouring agent since it is used to convert the sulfur dye to its leuco form. Of course, it is well known that sodium hydrosulfite is a stronger reducing agent than sodium sulfide and, thus, it would be expected that the former would be a more effective scouring agent than sodium sulfide. Sublimation fastness is a prime requisite since both Thermosol dyeing and curing are high temperature operations, 204° and 163° C., respectively. Any tendency of the dye to sublime can result in color transfer (i.e. staining) to adjacent fibers or garments during curing, as well as contamination of the Thermosoling ovens during dyeing. The novel dyes of this invention, when durable-press-treated, result in polyester fibers which possess superior acid- and alkaline-perspiration fastness properties.

Representative examples further illustrating the invention follow. Accompanying the following examples are Tables IV and V, which summarize the dyes' physical properties and dye test evaluation results.

EXAMPLE 1

(A) Preparation of coupler

N-2-cyanoethyl - N - 2 - hydroxyethylaniline (600 g.) is dissolved in 1000 g. of pyridine and the mixture cooled to 10–15° C. Benzoyl chloride (447 g.) is slowly added during three hours while maintaining the temperature at 10–15°. On completion of the addition the reaction mixture is agitated at 25–30° for 12 hours, then poured over 3 kg. of ice. The oily mass which separates crystallizes on stirring. The product is filtered, washed with water and dried. It is dissolved in 2.4 liters of isopropyl alcohol by heating to 50° C. The N-2-cyanoethyl-N-2-benzoyloxyethylaniline crystallizes on cooling. It is filtered, washed with cold isopropyl alcohol and dried, M.P. 66–66.5°.

*Analysis.*—Calcd. for $C_{18}H_{20}O_2N_2$ (percent): C, 72.95; H, 6.80; N, 9.45. Found (percent): C, 73.1; H, 6.5; N, 9.5.

(B) Preparation of dye

A mixture of 5.5 parts of N'-methylsulfanilamide, 2.42 parts of 30% hydrochloric acid and 9.8 parts of water were slurried to obtain a smooth paste, then 20.0 parts of chipped ice were added to bring the temperature down to 0° to 10°. To the slurry was added in a steady stream 2.18 grams of sodium nitrite as a 31.5% solution while keeping the temperature between 10–15° C. with ice addition. After nitrite addition was completed, the clear solution was allowed to situ at 15° for 15 minutes. Excess nitrite was destroyed by addition of sulfamic acid. The diazo solution was then added to a solution of 9.56 parts of N - 2 - cyanoethyl-N-2-benzoyloxyethylaniline in 72.0 parts of glacial acetic acid at 25° C. During the addition of diazo the dye began to precipitate. In some runs the dye originally began to oil out, but on further agitation became crystalline. After diazo addition was complete the iced slurry was stirred for 30 min., then a solution of 9.9 parts of sodium carbonate in 15.0 parts water was added. At this point the slurry changes from red to an organge color. After stirring for an additional two hours, 200 parts of water were added and the slurry filtered to give 24.0 parts of a wet cake which on drying yielded 12.0 parts of dye. Its absorption maximum in dimethylformamide is located at 426 m$\mu$ and the molar extinction coefficient in this solvent is 21,500.

The dye was made into paste form as follows: 10 parts of dye (on 100% basis), 2.5 parts of a lignin sulfonate dispersant, and enough water to adjust the active ingredient to the desired level, were milled together.

In a typical dyeing 50 parts of the paste were diluted to 1000 parts with water and padded onto a polyester/cotton fabric and dried. The fabric was then heated at 204.4° C. for 30 seconds to fix the dye in the polyester. In this manner the polyester was dyed a golden-yellow shade.

Using the same procedure outlined above and adjusting molar quantities, the dyes of Table IV were prepared.

EXAMPLE 2

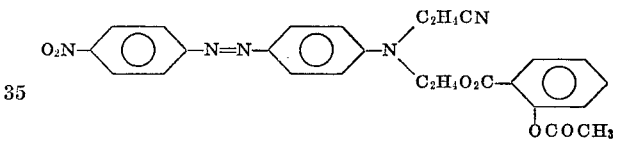

Using the diazotization procedure given in the previous example, 28 parts of p-nitroaniline was diazotized and the diazo solution added to a solution of 38 parts of N-2-cyanoethyl - N - 2 - hydroxyethylaniline dissolved in 100 parts of glacial acetic acid and 40 parts of dimethylformamide. The mixture was allowed to stir for one hour at 25° and then 500 parts of water were added. After filtering off the precipitated dye and washing with water, the filter cake was dried to give 44 gm. of a red colored dye. A solution of 12.7 parts of the red dye in 100 parts of pyridine was prepared and cooled to 10° C. To this was added a solution of five parts of 2-acetoxybenzoyl-chloride in 30 ml. of dioxane. After addition the mixture was allowed to come to room temperature. The orange slurry was drowned in 500 parts of water and 50 parts isopropanol. After filtration and drying, 18 parts of dye were obtained which dyed polyester yellow-orange in shade.

EXAMPLE 3

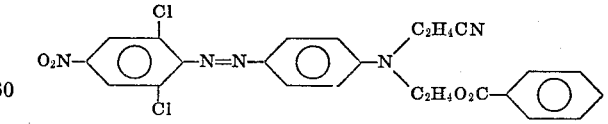

Seven parts of sodium nitrite were added to 125 parts of 98% sulfuric acid during the course of 30 minutes at a temperature of 25–30° C. The mixture is heated to 60° C. to produce a clear solution and then cooled to 25° C. 20.7 parts of 2,6-dichloro-4-nitroaniline are added slowly to the sulfuric acid solution and the mixture stirred until five drops of the solution produce no precipitate when diluted with 10 cc. of ice and water. The sulfuric acid solution is then poured on 180 parts of ice, additional ice being added to insure that the temperature does not rise above 5° C. A solution of 32.3 parts of N-2-cyanoethyl-N-2-benzoyloxyethyl aniline in 150 cc. of acetic acid at room temp. is then added to the sulfuric ice mixture. About 60 g. of ice are added during the course of the addition to insure that the mixture does not warm above 5° C. The mixture is stirred for 30 minutes, diluted with 400 parts of water and stirred for an additional 30 minutes. It is then filtered and washed with water and 2% ammonium hydroxide until the filter cake exhibits no acidic reaction with Congo Red paper. The filter cake is then washed with water and dried in an air stream for several hours to yield about 150 parts of damp filter cake containing about 44 parts of pure dye. The dye is dispersed as in Example 1.

EXAMPLE 4

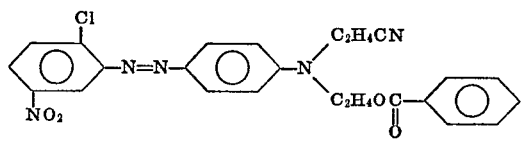

7.0 g. 2-chloro-5-nitro-aniline was slurried in 100 ml. water and 75 ml. conc. hydrochloric acid at 50–60° C. for 15 min. Then the slurry is rapidly cooled to 0–5° C. and while stirring 3.2 g. solid sodium nitrite are added portionwise during 5 min. After a total diazotization period of 20 minutes the excess nitrite is destroyed and a small amount of filter aid added. Then the diazo solution is filtered and used immediately. To 12.5 g. N-cyanoethyl-N-benzoyloxyethyl aniline dissolved in 90 ml. acetic acid and 10 ml. propionic and cooled to 5° C. are added, while stirring, the above diazo solution. The dye started to precipitate as a solid. At the end of the coupling 200 ml. water and 50 g. sodium acetate are added and the dye is filtered, washed with water and dried in vacuum.

Upon recrystallization from isopropanol, orange needles of M.P. 149–50° C. were obtained.

$\lambda_{max.}$ (DMF): 442 m$\mu$, $\epsilon$=26,100. The properties are shown in Table V.

EXAMPLE 5

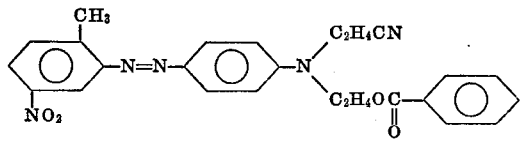

6.5 g. 2-methyl-5-nitro-aniline are dissolved in 25 ml. conc. hydrochloric acid, then with outside cooling, 50 g. ice are added followed by 9 ml. 5 N sodium nitrite. After ½ hour stirring the excess nitrite is destroyed with sulfamic acid and 5 g. filter aid is added prior to filtration. To 12.5 g. N-cyanoethyl-N-benzoyloxyethyl-aniline dissolved in 90 ml. acetic acid and 10 ml. propionic acid and cooled to 5° C. is added, while stirring, the above diazo solution. At the end of the coupling the dye is filtered, washed with water-ethanol, water and finally with a small amount of ethanol. 13.5 g. (=70%) of a yellow solid are obtained. Upon recrystallization orange crystals of M.P. 123° C. are obtained.

$\lambda_{max.}$ (DMF) 427 m$\mu$, $\epsilon$=20,600. The properties are shown in Table V.

Using the procedures of Examples 2–5, the other dyes shown in Table V were also prepared.

The following art recognized dyeing procedures may be utilized to apply the novel dyes of this invention to polyester fibers and blends thereof.

TABLE IV

Chemically equivalent amounts of diazo and coupler have been used in each example. Procedure as for Example 1.

$$R-N=N-\underset{C_2H_4O_2C-}{\overset{C_2H_4CN}{\diagup}}N\diagdown$$

| | | | | After durable press finished | | | |
| R | $\lambda_{max.}$ | $\epsilon$ | Shade | L.F. 20 hrs. carbon arc | Sublimation stain at 204.4° C. | Alkaline persp. | Yield |
| --- | --- | --- | --- | --- | --- | --- | --- |
| CH₃HNSO₂–⟨O⟩– (NO₂) | 450 | 30,000 | Yellow | 3 | 5 | 5 | 60 |
| ⟨O⟩–NHSO₂–⟨O⟩– | 428 | 18,500 | ...do... | 4 | 5 | 5 | 90 |
| O₂N–⟨O⟩– (SO₂NHCH₃) | 490 | 26,000 | Orange | 5 | 5 | 5 | 99 |
| ⟨O⟩– (SO₂NHCH₃) | 428 | 20,000 | Yellow | 5 | 5 | 4 | -------- |
| ⟨O⟩– (SO₂NHCH₃) | 420 | 20,000 | ...do... | 5–4 | 5 | 4 | -------- |
| NC–⟨O⟩– | 420 | 23,000 | ...do... | 5–4 | 5 | 4 | 86 |
| Cl–⟨O⟩– (Cl) | 418 | 21,000 | ...do... | 4–3 | 5 | 5 | 62 |
| CH₃NHO₂S–⟨O⟩– | 426 | 21,500 | ...do... | 5–4 | 5 | 5 | 99 |

Dyeing procedure—aqueous dyeing—
Vistamatic machine 40:1 volume

Bath set at 54.4° C. with one-half of total volume and
1.0% "Alkanol" HCS surface active agent
2.0% "Avitone" T dyeing assistant
2.0 g./l. monosodium phosphate (to maintain a pH of approximately 6.0)
5.0 g./l. "Carolid" (dispersed in Permutit water at 212° F.) and thoroughly mixed. For dyeings stronger than 3.0% strength (powder) 7.5 g./l. "Carolid" was used. X% dye, pasted with Permutit water at 54.4° C., added and bath made to total volume, and mixed well, "Dacron" fiber added and temperature raised to 92.8° C. After dyeing for two hours at this temperature the "Dacron" was rinsed and dried. This procedure was also used to dye 50/50 "Dacron" type 64/wool fabric.

TABLE V

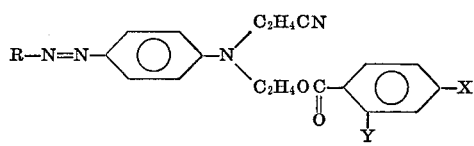

| R | X | Y | λmax. (DMF) | ε | Shade | Light-fastness 20 hours | A.A.T.C.C. No. 3# nylon acetate | Stain at 204.4° C. | Persp. alkaline | Crocking |
|---|---|---|---|---|---|---|---|---|---|---|
| C6H5-C(O)-C6H4- | H | H | 437 | 27,300 | Yellow | 5 | 4 | 4 | 5 | 5-4 | 5-4 |
| C6H5-C(O)-C6H3(Br)- | H | H | 455 | 31,600 | Orange | 5-4 | 4-3 | 4 | 5 | 5 | 4 |
| C6H5-SO2-C6H4- | H | H | 437 | 29,800 | Yellow | 5 | 4 | 4 | 5 | 5 | 4 |
| C6H5-SO2-C6H2(Br)2- | H | H | 410 | 25,200 | Brown-yellow | 5 | 5-4 | 5 | 5 | 5 | 5 |
| Cl-C6H3(CF3)- | H | H | 436 | 24,800 | Yellow | 5 | 4-3 | 4 | 4 | 5 | 4 |
| O2N-C6H4- | H | H | 463 | 29,800 | Orange | 5 | 3 | 4-3 | 5-4 | 5-4 | 4 |
| 2-Cl-4-NO2-C6H3- | H | H | 442 | 26,100 | Yellow | 5-4 | 4-3 | 4-3 | 5 | 5 | 5-4 |
| 2-CH3-4-NO2-C6H3- | H | H | 427 | 20,600 | do | 4-3 | 4-3 | 4-3 | 5 | 5-4 | 4 |
| O2N-C6H4- | H | OC(O)CH3 | 465 | 31,100 | Orange | 3-2 | 4 | 4 | 5 | 4 | 5-4 |
| O2N-C6H4- | -OC(O)CH3 | -OC(O)CH3 | 461 | 43,100 | do | 5-4 | 3-2 | 3-2 | 4 | 2 | 5-4 |
| O2N-C6H3(Cl)2- | H | H | 420 | 24,600 | do | 5 | 4 | 3 | 5 | 4 | 5 |
| O2N-C6H3(Cl)- | H | H | 483 | 31,600 | do | 5-4 | 4 | 4 | 5 | 5-4 | 5-4 |
| O2N-C6H3(CH3)- | H | H | 460 | 21,300 | do | 5-4 | 4 | 4 | 5 | 5-4 | 5-4 |

TABLE V—Continued

| R | X | Y | λmax. (DMF) | ε | Shade | Light-fastness 20 hours | A.A.T.C.C. No. 3# nylon acetate | Stain at 204.4° C. | Persp. alkaline | Crocking |
|---|---|---|---|---|---|---|---|---|---|---|
| 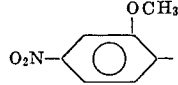 | H | H | 470 | 21,500 | ...do...... | 5-4 | 4 | 4 | 5 | 5-4 | 5-4 |
| 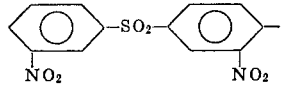 | H | H | 486 | 35,000 | .......... | 3-2 | 5-4 | 5-4 | 5 | 5 | 5-4 |

Dyeing procedure—pressure dyeing—package machine 15:1 volume

"Dacron" loaded in machine and bath set at 48.9° C. X% dye, dispersed with
    1.0% "Avitone" T added and liquor circulated, pH adjusted to 5.0-5.5 with acetic acid, temperature raised to 93.3° C. and held for 30 minutes.
Temperature raised to 121.1° C. and dyed for one hour. Bath cooled and dyeing rinsed and scoured for 15 minutes at 82.2° C. with:
2.0% "Duponol" RA surface active agent, rinsed well and dried.
Dyeings were also made according to this procedure with the addition of 3.0 g./l. DAC 888, which was added to the bath at 48.9° C.

Chemical equivalents or source for the trade name products, cited in the preceding dyeing procedures, are as follows:

"Alkanol" HCS—Nonionic surfactant, long chain alcohol condensate with ethylene oxide.
"Avitone" T—Long chain hydrocarbon sulfonate composition.
"Carolid"—Self emulsifiable modified phenol derivative.
"Duponol" RA—Alcohol ether sodium sulfate.
DAC 888—A butyl benzoate carrier.

The above trade name products are identified in McCutcheon's, Detergents and Emulsifiers, 1966 Annual, or A.A.T.C.C. Technical Manual, 1963.

These procedures result in dyeings reflecting good light-, sublimation- and wash-fastness properties.

The novel yellow dyes of this invention may be formulated into pastes or powders to facilitate commercial use.
More specifically, these dyes may be formulated in a paste as follows; all parts are by weight:

| | |
|---|---|
| Yellow dye | 18.81 |
| "Polyfon" O | 15.00 |
| Sorbitol | 7.89 |
| "Nalco" 71-D-5 | 0.17 |
| "Dowicide" G | 0.10 |
| Sodium Silicofluoride | 0.10 |
| Paraformaldehyde | 0.10 |
| Water | 57.83 |
| | 100.00 |

In the preceding paste formulation "Polyfon" O, a sodium lignosulfonate, is an anionic dispersant. Sorbitol is a humectant and is added to prevent the pastes from drying out. "Nalco" 71-D-5 is an anti-foam agent. "Dowicide" G, sodium silicofluoride and paraformaldehyde are added to inhibit bacteria growth in the pastes.

The novel dyes of this invention also have utility in the printing field. For printing, a yellow paste formulation, as herein exemplified, is utilized; Thermosol treatment or pressure steaming is required to obtain desirable buildup and proper shade. When Thermosoled on cotton, the resulting print may be given a vat-flash age treatment in caustic and hydro to substantially remove any product stains. Said paste formulations may be printed on cotton, "Dacron" polyester fiber and blends thereof. Also, good development is achieved on Arnel and acetate.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiment recited hereinabove.

The embodiments of the invention in which an exclusive property or privilege is claimed are as follows:

1. Monoazo dyes of the structure:

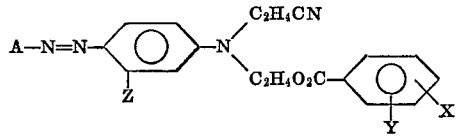

wherein A is a substituted phenyl group bearing up to three substituents selected from the group —$NO_2$, Cl, Br, —CN, $C_{1-4}$ alkyl, $C_{1-4}$ alkoxy, trifluoromethyl, $C_{1-4}$ alkylsulfonyl, phenylsulfonyl, $C_{1-4}$ N-alkylsulfamyl, $C_{1-4}$ N-alkylcarboxamido, $C_{1-4}$ carbalkoxy, benzoyl and N-phenylsulfamyl; X and Y are the same or different substituents selected from the group H, Cl, Br, $C_{1-4}$ alkyl, nitro, $C_{1-4}$ alkanoxyloxy, and $C_{1-4}$ alkoxy; Z is $C_{1-4}$ alkyl, $C_{1-4}$ alkoxy, Cl, Br, or hydrogen.

2. The monoazo dye

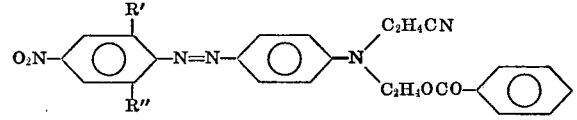

wherein R' is Cl and R" is H or Cl, or R' is CN and R" is H.

3. The monoazo dye

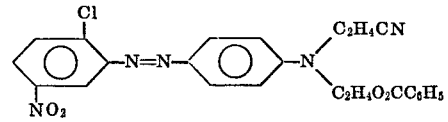

4. The monoazo dye

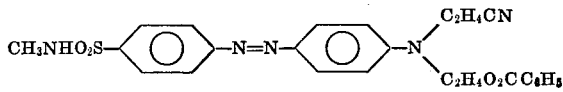

5. The monoazo dye

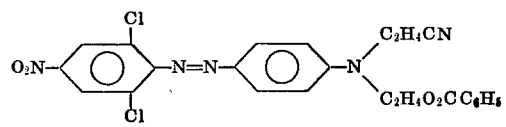

6. The monoazo dye
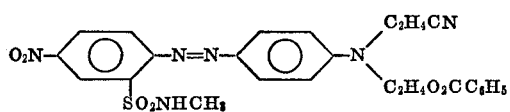
7. The monoazo dye
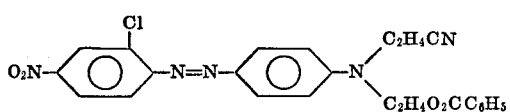
8. The monoazo dye
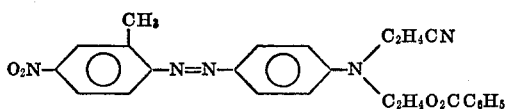
9. The monoazo dye
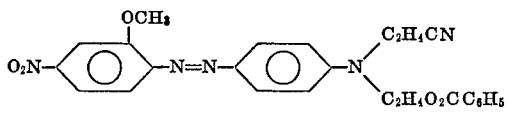
10. The monoazo dye
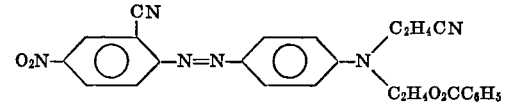
References Cited
FOREIGN PATENTS
887,416 1/1962 Great Britain _____ 260—207.1
1,461,855 11/1966 France _____ 260—207.1
LEWIS GOTTS, Primary Examiner
C. F. WARREN, Assistant Examiner
U.S. Cl. X.R.
260—207.1; 8—24, 41 C